United States Patent
Zhang et al.

(10) Patent No.: US 8,253,065 B2
(45) Date of Patent: Aug. 28, 2012

(54) LASER ENGRAVING SYSTEM

(75) Inventors: Song Zhang, Shenzhen (CN); Xiong-Bo Fu, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 1308 days.

(21) Appl. No.: 11/946,320

(22) Filed: Nov. 28, 2007

(65) Prior Publication Data

US 2008/0302771 A1 Dec. 11, 2008

(30) Foreign Application Priority Data

Jun. 8, 2007 (CN) .......................... 2007 1 0074780

(51) Int. Cl.
*B23K 26/38* (2006.01)
(52) U.S. Cl. .................................. 219/121.68
(58) Field of Classification Search ............. 219/121.61, 219/121.62, 121.68, 121.69, 121.83, 121.78, 219/121.82; 382/151; 702/167
See application file for complete search history.

(56) References Cited

U.S. PATENT DOCUMENTS

| | | | | |
|---|---|---|---|---|
| 4,383,168 A * | 5/1983 | Luck, Jr. | ..................... | 250/201.4 |
| 5,225,650 A * | 7/1993 | Babel et al. | ............... | 219/121.69 |
| 5,384,717 A * | 1/1995 | Ebenstein | ..................... | 702/167 |
| 6,078,331 A * | 6/2000 | Pulli et al. | ..................... | 345/423 |
| 2002/0167518 A1* | 11/2002 | Migdal et al. | .................. | 345/428 |
| 2003/0135846 A1* | 7/2003 | Jayaram et al. | ............... | 717/137 |
| 2004/0232108 A1* | 11/2004 | Giori | ............... | 216/54 |
| 2005/0089213 A1* | 4/2005 | Geng | ............... | 382/154 |
| 2007/0086822 A1* | 4/2007 | Sato | ............... | 400/129 |
| 2007/0100492 A1* | 5/2007 | Idaka et al. | ................. | 700/166 |
| 2007/0120842 A1* | 5/2007 | Hess | ............... | 264/400 |
| 2007/0127808 A1* | 6/2007 | Daniel, Jr. | ................. | 382/152 |

FOREIGN PATENT DOCUMENTS

| | | | |
|---|---|---|---|
| EP | 917035 A2 | * | 5/1999 |
| JP | 5-212569 A | * | 8/1993 |
| JP | 2004-42336 A | * | 2/2004 |
| KR | 2003-0025044 A | * | 3/2003 |
| WO | 2007/042895 A2 | | 4/2007 |

OTHER PUBLICATIONS

Machine translation of Japan Patent document No. 5-212,569-A, Dec. 2011.*
Machine translation of Korean Patent document No. 2003-0025044, Dec. 2011.*
Machine translation of Japan Patent document No. 2004-42,336, Dec. 2011.*

* cited by examiner

*Primary Examiner* — Geoffrey S Evans
(74) *Attorney, Agent, or Firm* — Altis Law Group, Inc.

(57) ABSTRACT

A laser engraving system (10) for engraving a unengraved workpiece (20) and an engraving method are provided. The laser engraving system includes an image processor (12), an engraving controller (13), a mechanical arm (14), and a laser (15). The image processor is configured for building a workpiece model (22) corresponding to an unengraved workpiece, partitioning the workpiece model into at least one section (224), generating at least one two-dimensional pattern (223). The engraving controller receives the signals of the relative position values and the at least one two-dimensional pattern. The mechanical arm is electronically coupled to the engraving controller and controlled by the engraving controller. The laser is electronically coupled to the engraving controller and controlled by the engraving controller in such a manner that the laser engraves an unengraved workpiece according to the at least one two-dimensional pattern.

2 Claims, 9 Drawing Sheets

LASER ENGRAVING SYSTEM

BACKGROUND OF THE INVENTION

1. Field of the Invention

The present invention relates to laser engraving systems and engraving methods, particularly to a 3D (i.e., three-dimensional) laser engraving system and a 3D engraving method thereof.

2. Description of Related Art

Laser engraving is the practice of using lasers to engrave or mark an object/workpiece. A computer system is usually used to drive the movements of a laser in order to achieve precise and clean engravings. The laser engraving does not result in tool bits contacting the engraving surface. This is considered an advantage over alternative engraving technologies where bit heads have to be replaced regularly.

A laser engraving system for engraving a workpiece can be defined as two main parts: a laser and a controller. The controller controls the beam emitted from the laser to trace patterns onto the workpiece. The controller (usually a computer) controls the direction, intensity, speed of movement, and spread of the laser beam aimed at the workpiece. The workpiece is picked to match what the laser can act on.

Typically, there are three main genres of laser engraving systems. The most common is the X-Y table (i.e., two-dimensional (2D) laser engraving system) where, usually, the workpiece is stationary and the laser moves around in X and Y directions drawing vectors. Sometimes the laser is stationary and the workpiece moves and sometimes the workpiece moves in the Y-axis and the laser moves in the X-axis. A second genre is a 3D laser engraving system, particular for a cylindrical workpiece (or a flat workpiece mounted around a cylinder) where the laser effectively traverses a fine helix and the on/off laser pulsing produces the desired image on a raster basis. In the third method for 3D laser engraving, both the laser and workpiece are stationary while mirrors move the laser beam over the workpiece surface. Laser engravers use this technology in either raster or vector mode.

The third genre of the laser engraving system is suitable for engraving different size/shape of workpieces. However, the present laser engraving system can be very technical and complex. Thus, the system is quite expensive and is not easy to handle/operate.

What is needed, therefore, is a laser engraving system for engraving a three-dimensional pattern onto a workpiece and an engraving method thereof to overcome the above-mentioned shortcomings.

SUMMARY

In one aspect thereof, a laser engraving system for engraving an unengraved workpiece is provided. The laser engraving system includes an image processor, an engraving controller, a mechanical arm, and a laser. The image processor is configured for building a workpiece model corresponding to an unengraved workpiece, partitioning the workpiece model into at least one section, generating at least one two-dimensional pattern, determining relative position values of the at least one section, and outputting signals of the relative position values and the at least one two-dimensional pattern. The engraving controller is electronically coupled to the image processor. The engraving controller receives signals from the image processor of the relative position values and the at least one two-dimensional pattern. The mechanical arm is electronically coupled to the engraving controller and controlled by the engraving controller in such a manner that the mechanical arm is set to position an unengraved workpiece according to the signals of the relative position values. The laser is electronically coupled to the engraving controller and controlled by the engraving controller in such a manner that the laser engraves an unengraved workpiece according to the at least one two-dimensional pattern.

In another aspect thereof, an engraving method of the above laser engraving system is provided. The laser engraving system includes an image processor, an engraving controller, a mechanical arm, and a laser. The engraving method includes steps as follows. An unengraved workpiece combined with the mechanical arm is provided. A workpiece model is build corresponding to an unengraved workpiece via the image processor. At least one section of the workpiece model is partitioned via the image processor. At least one two-dimensional pattern is generated via the image processor. Relative position values of the at least one section are determined via the image processor. Signals of the relative position values and the at least one two-dimensional pattern are outputted to the engraving controller via the image processor. An unengraved workpiece is positioned according to the signals of the relative position values by the mechanical arm. The unengraved workpiece is engraved according to the at least one two-dimensional pattern by the laser.

Other advantages and novel features will become more apparent from the following detailed description when taken in conjunction with the accompanying drawings.

BRIEF DESCRIPTION OF THE DRAWINGS

Many aspects of the present laser engraving system and the engraving method can be better understood with reference to the following drawings. These drawings are not necessarily drawn to scale, the emphasis instead being placed upon clearly illustrating the principles of the present laser engraving system and the engraving method. Moreover, in the drawings like reference numerals designate corresponding parts throughout the several views.

DETAILED DESCRIPTION OF THE EMBODIMENTS

The present laser engraving system and engraving method thereof is suitable for engraving a three-dimensional workpiece with a pattern. In other words, the present system and method thereof can engrave a three-dimensional pattern onto a workpiece. The workpiece can be made of any specially designed "laserable" materials, such as polymer, novel metal alloys, or the like. An unengraved workpiece 20, shown in FIG. 2, exemplifies to be engraved by the present laser engraving system 10 shown in FIG. 1.

Figure 1:
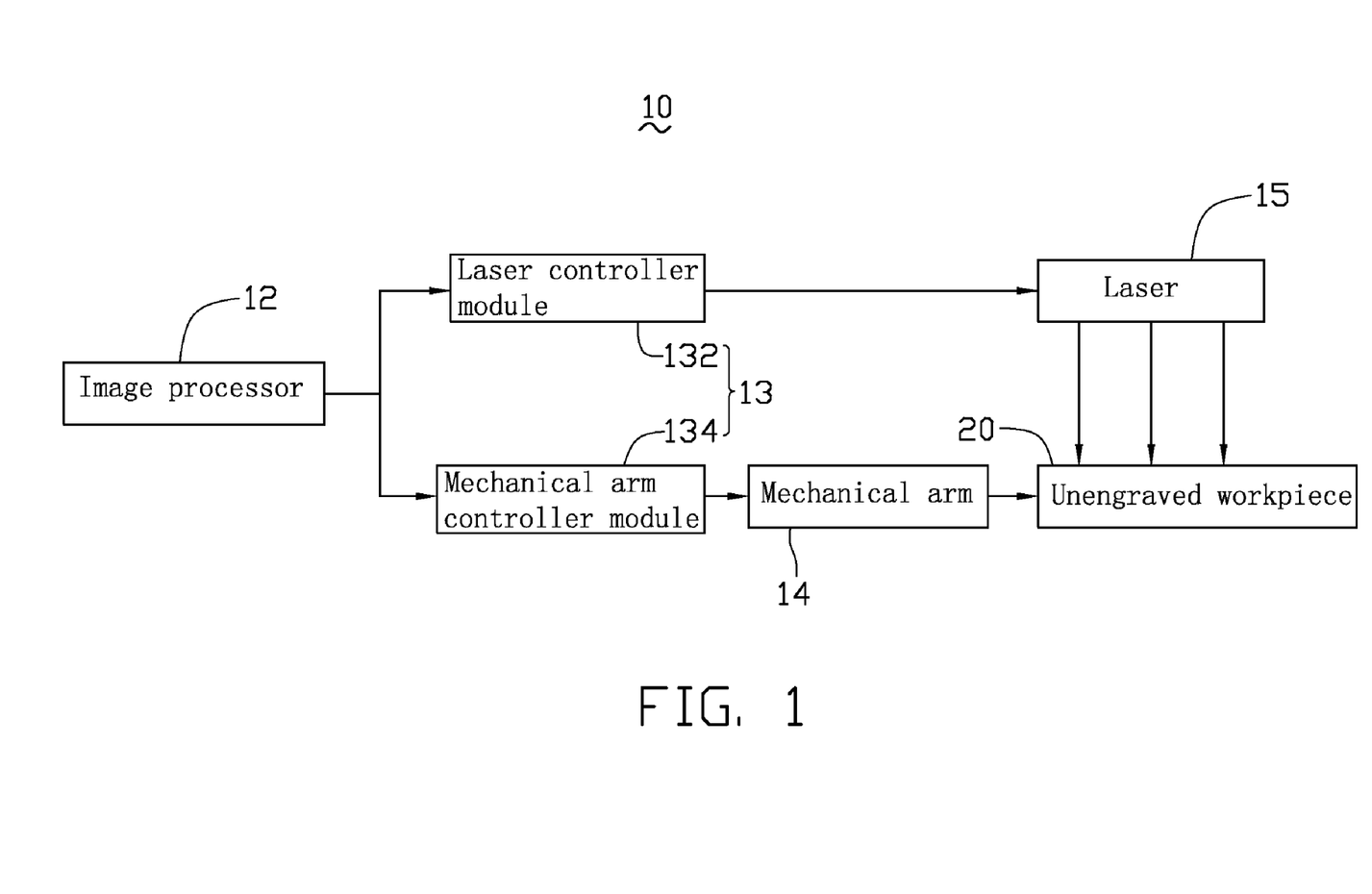
FIG. 1 is a functional module diagram of a laser engraving system in accordance with a present embodiment.
Figure 2:
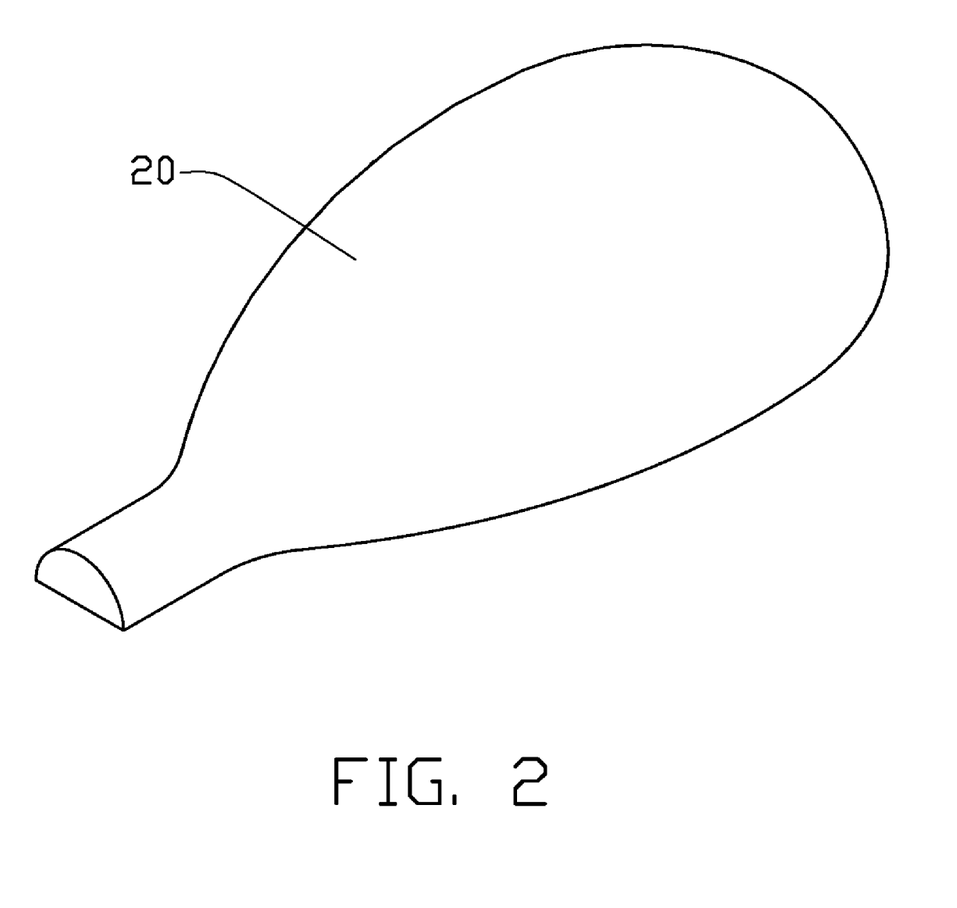
FIG. 2 is an isometric view of an unengraved workpiece illustrated in FIG. 1.

Referring to the drawings in detail, FIG. 1 shows a present laser engraving system 10. The laser engraving system 10 includes an image processor 12, an engraving controller 13, a mechanical arm 14, and a laser 15.

The image processor 12 is installed with an image processing software, such as ProE software, 3D MAX software or the like. The function of the image processing software is to construct/build workpiece model, to partition the workpiece model, to generate two-dimensional pattern, and to determine position values of each partitioned section.

The engraving controller 13 is electronically connected/coupled (e.g., via a hard-wired or wireless link) to the image processor 12, the mechanical arm 14, and the laser 15. The engraving controller 13 receives information/signals (e.g., position values of each partitioned section of the workpiece model, or two-dimensional pattern) and thus controls the movement of laser 15 and the mechanical arm 14. The engraving controller 13 includes a laser controller module 132 and a mechanical arm controller module 134. The laser controller module 132 and the mechanical arm controller module 134 are electronically connected/coupled (e.g., via a hard-wired or wireless link) to the image processor 12. The laser controller module 132 is used to receive signal of two-dimensional pattern output from the image processor 12. The function of the mechanical arm controller module 134 is to receive information of position values of each partitioned section of the workpiece model sent by the image processor 12.

The laser 15 is controlled by the laser controller module 132 to emit laser beam to engrave the unengraved workpiece and thus to move/follow a particular path to engrave a particular pattern onto the unengraved workpiece. The frequency, intensity, speed, and trace of the laser 15 is determined by the signal of two-dimensional pattern.

The workpiece 20 is fixed/secured to the mechanical arm 14 and allows the mechanical arm 14 to control the movement and the relative position thereof.

An engraving method of the laser engraving system 10 is illustrated in FIG. 3 through FIG. 9. The engraving method implemented by the laser engraving system 10 is exemplified to engrave the unengraved workpiece 20 (shown in FIG. 2) and the steps thereof are as follows.

Figure 3:
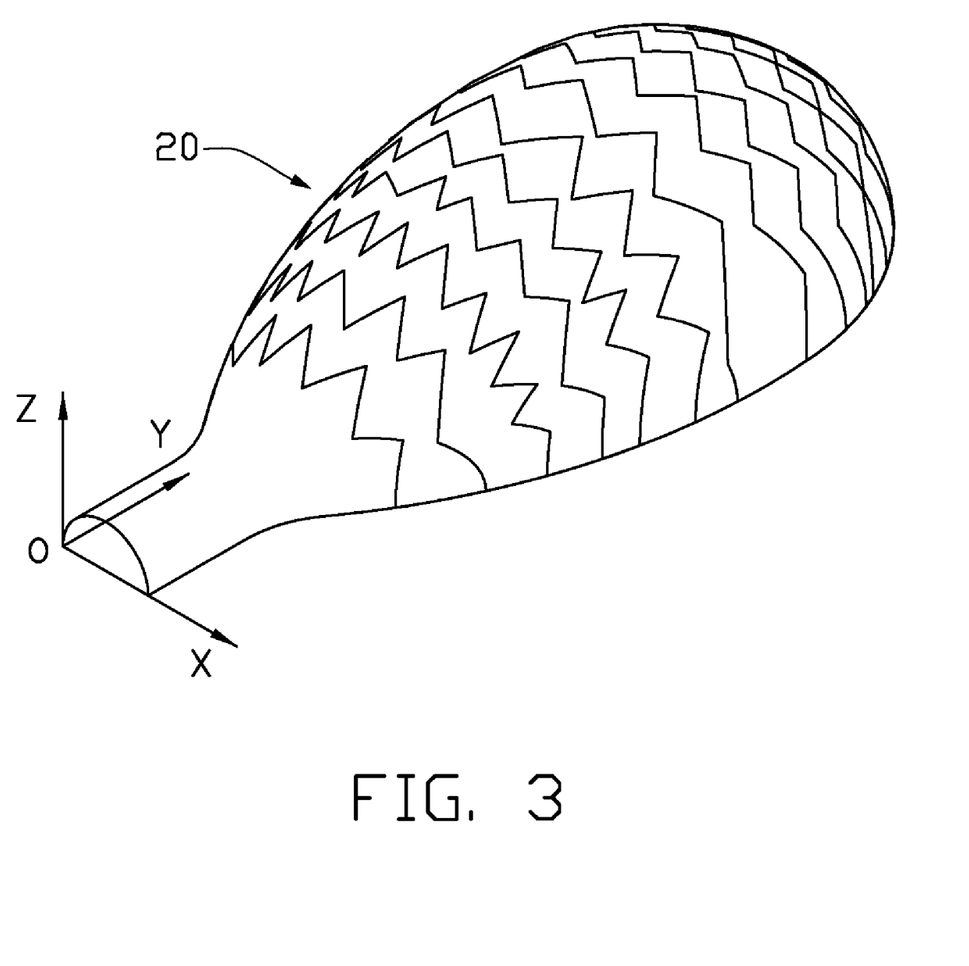
FIG. 3 is an isometric view of the unengraved workpiece with a workpiece cartesian coordinate system XYZ shown in FIG. 2.
Figure 4:
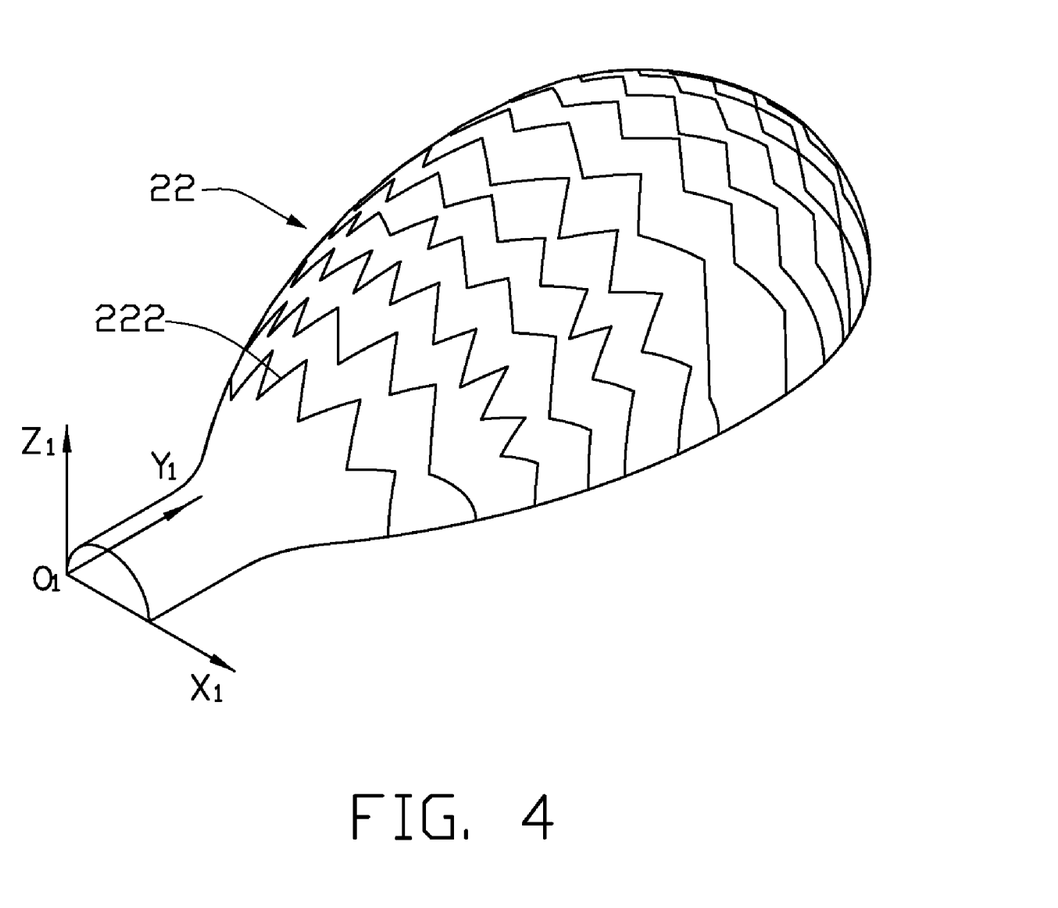
FIG. 4 is an isometric view of the unengraved workpiece with a visual workpiece cartesian coordinate system $X_1 Y_1 Z_1$ shown in FIG. 2.

Referring to FIG. 3, a workpiece cartesian coordinate system XYZ is defined on the unengraved workpiece 20. The zero point O of the workpiece cartesian coordinate system XYZ is defined on the unengraved workpiece 20.

The image processing software of the image processor 12 constructs/defines a visual workpiece cartesian coordinate system $X_1Y_1Z_1$ (shown in FIG. 4) in accordance with the cartesian coordinate system XYZ (shown in FIG. 3). Based on the visual workpiece cartesian coordinate system $X_1Y_1Z_1$, a workpiece model 22 is formed via the image processing software. The workpiece model 22 is essentially the same as the unengraved workpiece 20 shown in FIG. 3.

Figure 5:
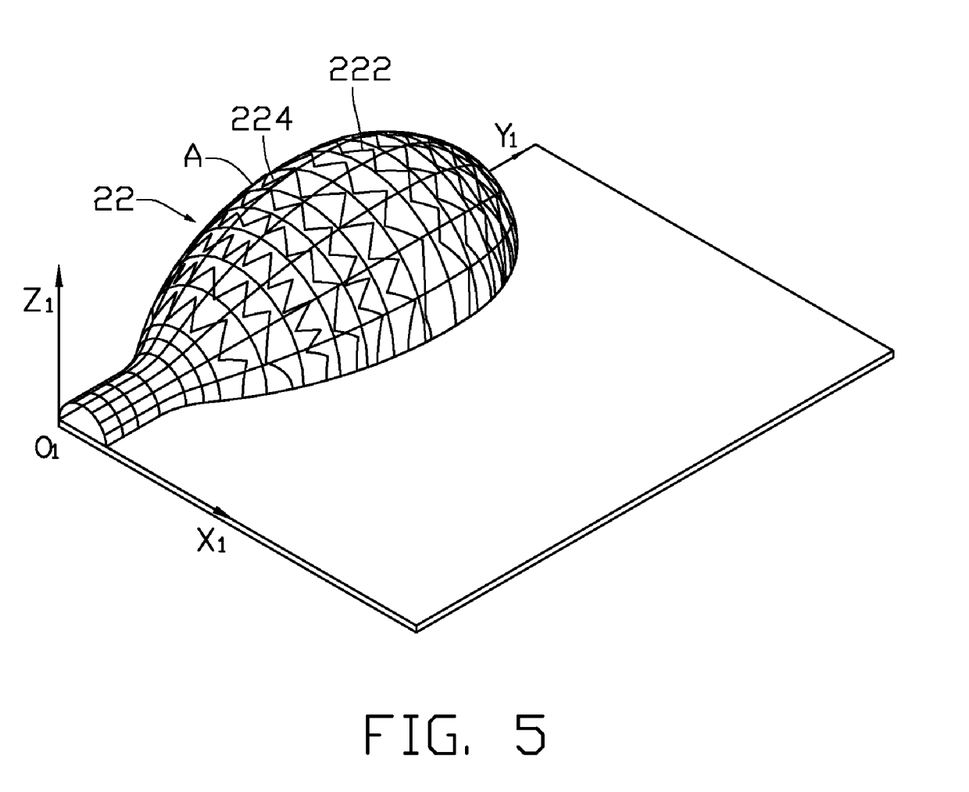
FIG. 5 is an isometric view of the unengraved workpiece shown in FIG. 4, partitioned by the laser engraving system shown in FIG. 1.

Referring further to FIG. 5, the image processing software partitions/divides the exterior surface of the workpiece model 22 into a plurality of sections 224 according to an unengraved three-dimensional pattern 222, and thus defines a plurality of respective reference planes A corresponding to partitioned sections. The exterior surface of the workpiece model 22 can be partitioned/divided into variety of patterns in such a manner that the area of each section 224 cannot exceed the maximum engraving area of the laser engraving system 10. The reference plane A can be selected from a variety of planes of each section 224 in such a manner that distance of each point of the section 224 from the reference plane A are minimized and not exceed 1 millimeter.

Figure 6:
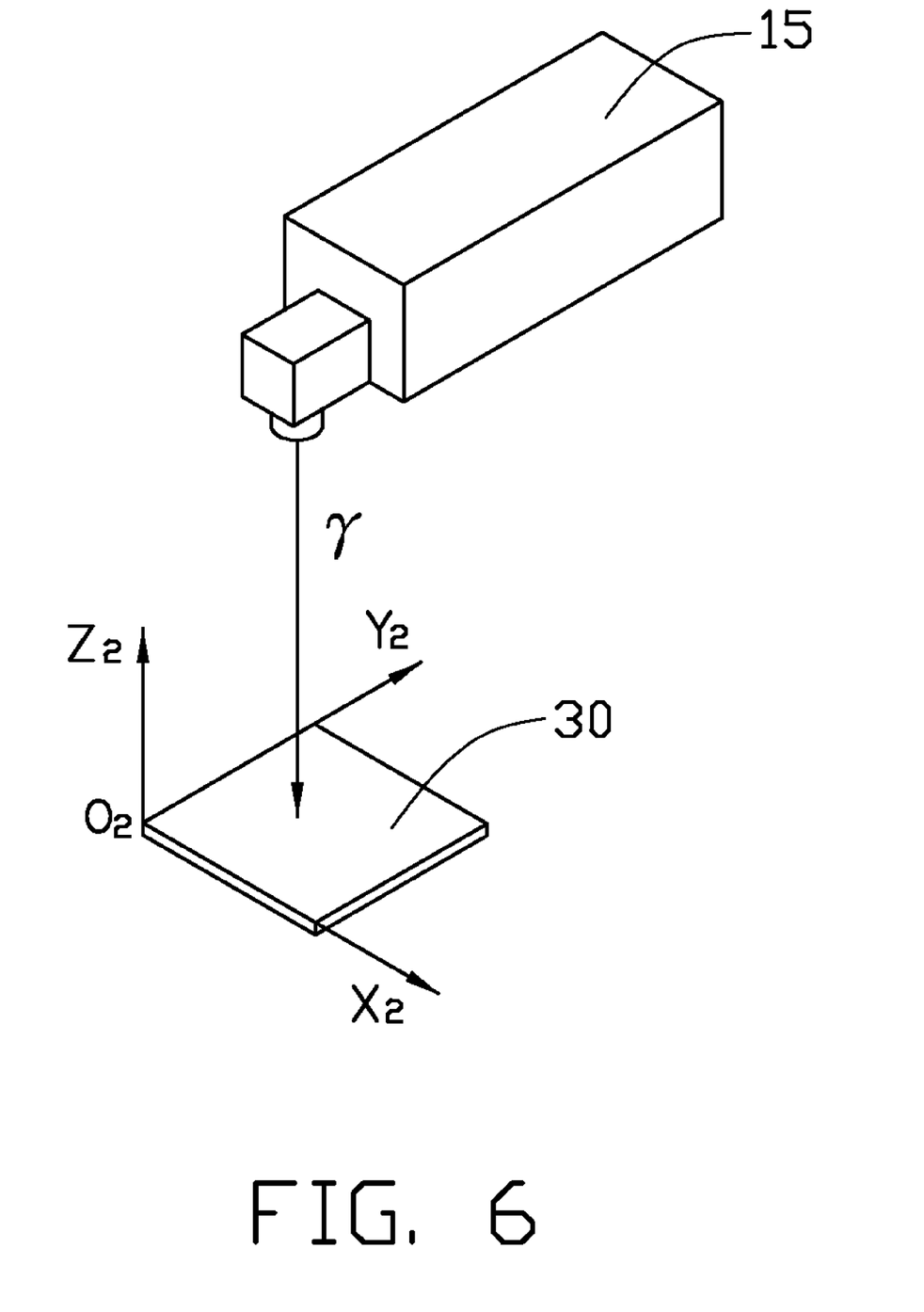
FIG. 6 is a tool cartesian coordinate system $X_2 Y_2 Z_2$, which is defined by a laser illustrated in FIG. 1.

Referring also to FIG. 6, the laser 15, which is controlled by the engraving controller 13 is equipped with the function of emitting laser beam r to engrave the unengraved workpiece 20 and thus to move/follow a particular path to engrave a particular pattern onto the unengraved workpiece 20. A focal plane $X_2Y_2$ is defined by the laser beam r. The focal plane X2Y2 of the laser beam r is the engraving area 30 of the laser 15. Based on the focal plane $X_2Y_2$, a tool cartesian coordinate system $X_2Y_2Z_2$ is defined with the $Z_2$ axis that extends to the same direction with that of the laser beam r.

Figure 7:
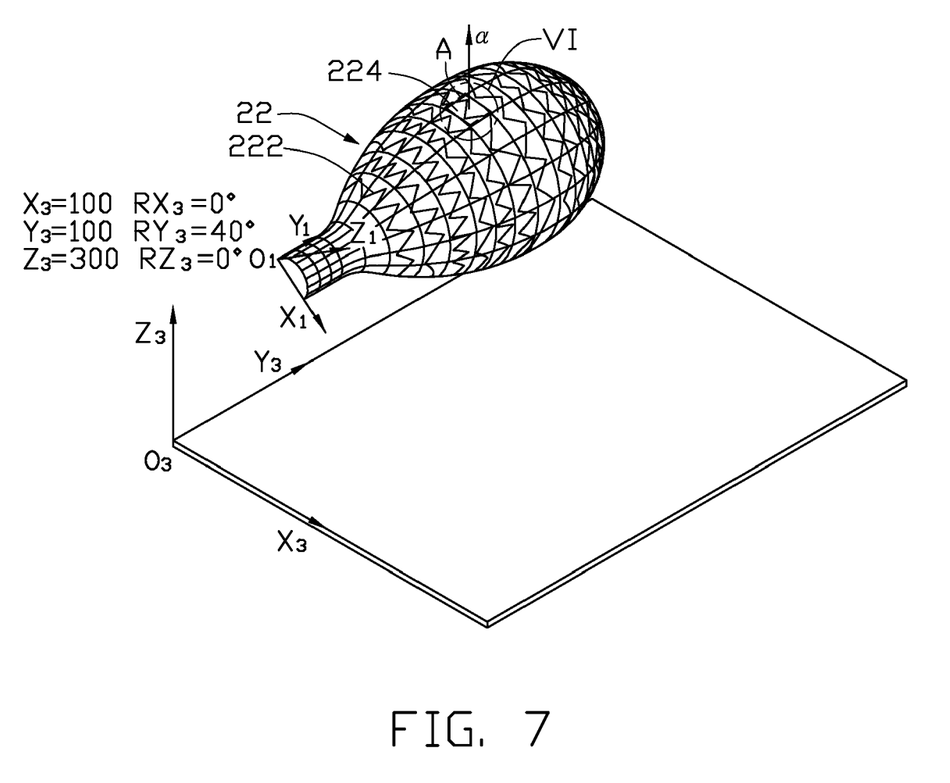
FIG. 7 is an isometric view of the unengraved workpiece, shown in FIG. 4, in a visual tool cartesian coordinate system $X_3 Y_3 Z_3$.

Referring further to FIG. 7, the image processing software of the image processor 12 further construct a visual tool cartesian coordinate system $X_3Y_3Z_3$ in accordance with the tool cartesian coordinate system $X_2Y_2Z_2$. In this case, the $X_3Y_3$ plane corresponds to the engraving area 30 of the laser 15. The workpiece model 22 is visualized by the image processor 12 and then located above the engraving area 30 and is such configured (i.e., arranged/structured) that the positive normal of the reference plane A of the section 224 being essentially the same as that of the $Z_3$ axis. In other words, the reference plane A is configured to be essentially parallel to the $X_3Y_3$ plane.

At this time, a relative position value of the zero point $O_1$ of the visual workpiece cartesian coordinate system $X_1Y_1Z_1$ in the visual tool cartesian coordinate system $X_3Y_3Z_3$ is as follows: $X_3=100$, $Y_3=100$, $Z_3=300$, $R_{X3}=0°$, $R_{Y3}=40°$, $R_{Z3}=0°$. $X_3$, $Y_3$, and $Z_3$ respectively represent one value of displacement of the zero point $O_1$ relative to one of the $X_3$ axis, the $Y_3$ axis, and the $Z_3$ axis. $R_{X3}$, $R_{Y3}$, and $R_{Z3}$ respectively represent one value of angle of the $X_1$ axis, the $Y_1$ axis, and the $Z_1$ axis relative to the respective $X_3$ axis, the $Y_3$ axis, and the $Z_3$ axis. The image processor 12 continuously outputs and transfers the relative position values of the zero point $O_1$ to the mechanical arm controller module 134 of the engraving controller 13.

It is to be understood that, the relative position value of the zero point $O_1$ of the visual workpiece cartesian coordinate system $X_1Y_1Z_1$ in the visual tool cartesian coordinate system $X_3Y_3Z_3$ can be determined regarding to each section 224 of the workpiece model 22. The visual workpiece cartesian coordinate system X1Y1Z1 corresponds to the workpiece cartesian coordinate system XYZ. The visual tool Cartesian coordinate system X3Y3Z3 corresponds to the workpiece cartesian coordinate system X2Y2Z2. Thus, the position of the unengraved workpiece 20 relative to the engraving area 30 of the laser 15 can be determined.

Figure 8:
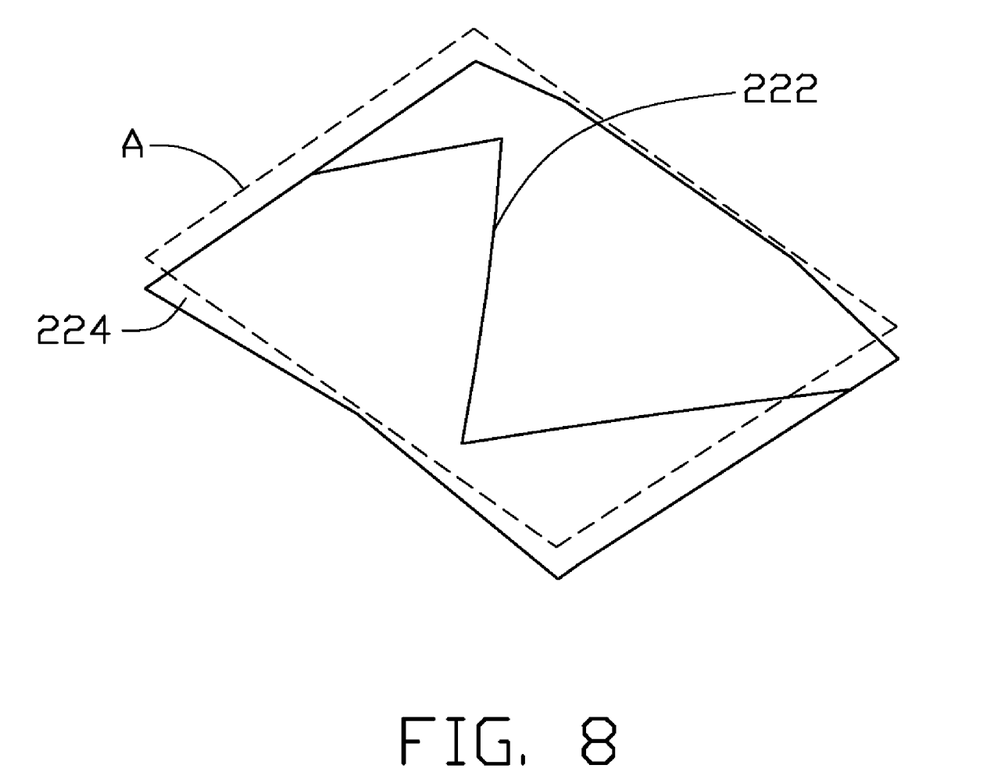
FIG. 8 is an enlarged view of an area VI of the unengraved workpiece shown in FIG. 7.
Figure 9:
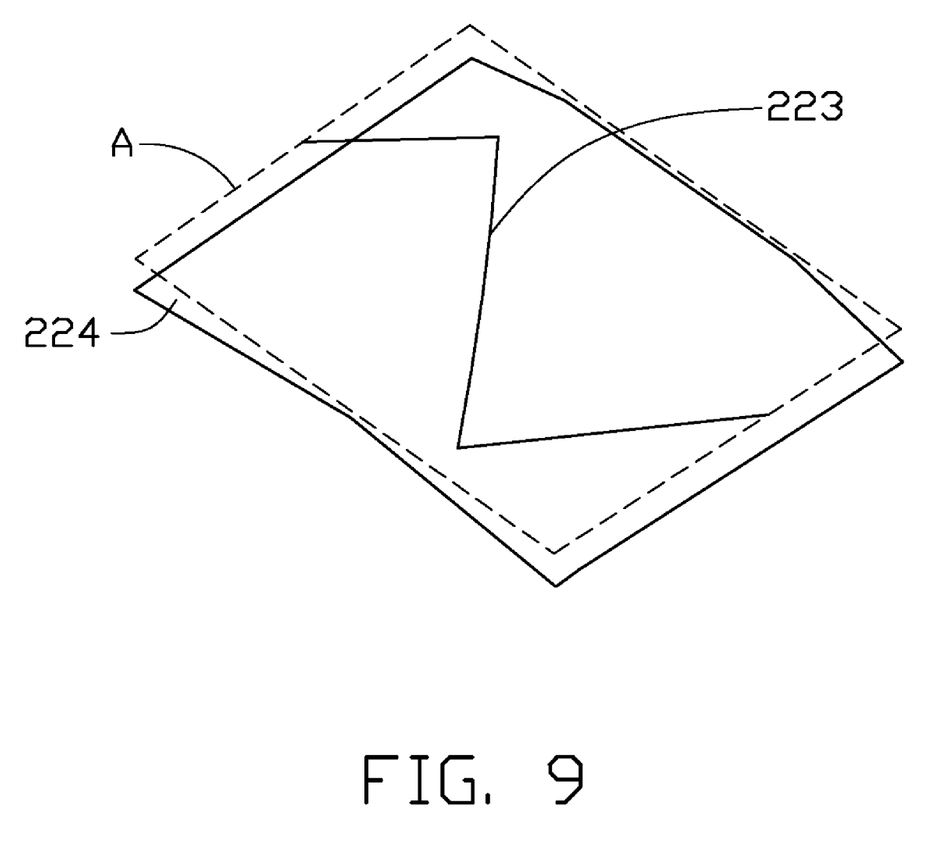
FIG. 9 is an isometric view of the section VI shown in FIG. 7, showing a pattern shown in FIG. 8 projected to a corresponding reference plane shown in FIG. 8.

Referring also to FIGS. 7 and 8, the need-to-be engraved, three-dimensional pattern 222 is projected to the corresponding reference plane A of each partitioned section 224 of the workpiece model 22. Thus, the image processor 12 generates a two-dimensional pattern 223 and outputs the signal of two-dimensional pattern 223 to the engraving controller 13 module of the engraving controller 13.

The mechanical arm controller module 134 of the engraving controller 13 drive the unengraved workpiece 20 combined with the mechanical arm 14 so as that the unengraved workpiece 20 moves and resides at a particular position relative to the laser 15. The unengraved workpiece 20 is located at a particular position in accordance with the relative position values of the zero point $O_1$, i.e., $X_3=100$, $Y_3=100$, $Z_3=300$, $R_{X3}=0°$, $R_{Y3}=40°$, $R_{Z3}=0°$.

The laser controller module 132 drive the laser 15 to engrave the unengraved workpiece 20 in accordance with two-dimensional pattern 223 generated by the image processor 12.

In the working stage of the mechanical arm 14 and the laser 15, the mechanical arm controller module 134 initially positions the mechanical arm 14 to combined with the unengraved workpiece 20 at a specific position (e.g., $X_3=100$, $Y_3=100$, $Z_3=300$, $R_{X3}=0°$, $R_{Y3}=40°$, $R_{Z3}=0°$) during engraving one section 224 of the three-dimensional pattern. The operation of the laser 15 is stopped during this working stage. When the mechanical arm 14 combined with the unengraved workpiece 20 to reach and stay at the specific position, laser beam of the laser 15 is driven to engrave the unengraved section of the unengraved workpiece 20. In this case, the mechanical arm 14 stops the operation, and the unengraved workpiece doesn't move until the section is engraved. The laser 15 finally engraves all the sections of the unengraved workpiece 20.

The main advantages of the laser engraving system 10 and the engraving method thereof are as follows. The unengraved workpiece 20 is precisely partitioned to a plurality of sections 224 by the image processor 12. During the engraving, the unengraved workpiece 20 is precisely driven by the mechanical arm 14. The laser 15 respectively engraves the plurality of sections 224. Thus, the unengraved workpiece 20 can precisely engraved a three-dimensional pattern 222 thereon.

During engraving, the engraving of the laser 15 is actually a process of two-dimensional engraving. Thus, the laser engraving system 10 is substantially a two-dimensional engraving system plus a mechanical arm 14 that can perform a precise three-dimensional engraving. Thus, the laser engraving system 10 is relatively easy to construct as a result of cost-saving and easy to operate.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A laser engraving system for engraving an unengraved workpiece, comprising:
    an image processor configured for building a workpiece model corresponding to an unengraved workpiece, partitioning the workpiece model into at least one section, generating at least one two-dimensional pattern, determining relative position values of the at least one section, and outputting signals of the relative position values and the at least one two-dimensional pattern, the image processor defining respective reference plane in respective section, and the two-dimensional pattern generated by reflecting a three-dimensional pattern onto the reference plane, the reference plane selected from a variety of planes of each section according to a rule that distance of each point of the section from the reference plane are minimized and not exceed 1 millimeter;
    an engraving controller electronically coupled to the image processor, receiving the signals of the relative position values and the at least one two-dimensional pattern from the image processor;
    a mechanical arm electronically coupled to the engraving controller and controlled by the engraving controller in such a manner that the mechanical arm positions an unengraved workpiece according to the signals of the relative position values;
    a laser electronically coupled to the engraving controller and controlled by the engraving controller in such a manner that the laser engraves an unengraved workpiece according to the at least one two-dimensional pattern;
    wherein the engraving controller comprise a laser controller module and a mechanical controller module, the laser controller module and the mechanical arm controller module are electronically coupled to the image processor, the laser controller module receives the signals of the two-dimensional pattern, and the mechanical arm controller module receives the signals of the position values.

2. The laser engraving system as claimed in claim 1, wherein the laser controller module is electronically coupled to the laser, and the laser controller module is configured for control frequency, intensity, speed and trace of the laser according to the two-dimensional pattern.

* * * * *